United States Patent
Yanagita et al.

(10) Patent No.: US 10,106,428 B2
(45) Date of Patent: Oct. 23, 2018

(54) METHOD FOR PRODUCING SURFACE-MODIFIED SILICA NANOPARTICLES, AND SURFACE-MODIFIED SILICA NANOPARTICLES

(71) Applicant: AZ Electronic Materials (Luxembourg) S.a.r.l., Luxembourg (LU)

(72) Inventors: Hiroshi Yanagita, Kakegawa (JP); Shigemasa Nakasugi, Kakegawa (JP); Hiroshi Hitokawa, Kakegawa (JP); Tomohide Katayama, Kakegawa (JP); Katsuyuki Sakamoto, Kakegawa (JP)

(73) Assignee: AZ Electronic Materials (Luxembourg) S.a.r.l., Luxembourg (LU)

( * ) Notice: Subject to any disclaimer, the term of this patent is extended or adjusted under 35 U.S.C. 154(b) by 73 days.

(21) Appl. No.: 15/315,616

(22) PCT Filed: May 28, 2015

(86) PCT No.: PCT/JP2015/065382
§ 371 (c)(1),
(2) Date: Dec. 1, 2016

(87) PCT Pub. No.: WO2015/186596
PCT Pub. Date: Dec. 10, 2015

(65) Prior Publication Data
US 2017/0190586 A1     Jul. 6, 2017

(30) Foreign Application Priority Data

Jun. 3, 2014 (JP) .................... 2014-114873

(51) Int. Cl.
| | |
|---|---|
| C01B 33/18 | (2006.01) |
| C01B 33/145 | (2006.01) |
| C09C 1/30 | (2006.01) |
| C09C 3/12 | (2006.01) |

(52) U.S. Cl.
CPC ............ C01B 33/18 (2013.01); C01B 33/145 (2013.01); C09C 1/30 (2013.01); C09C 3/12 (2013.01)

(58) Field of Classification Search
CPC ......... C01B 33/18; C01B 33/145; C09C 3/12; C09C 1/30
See application file for complete search history.

(56) References Cited

U.S. PATENT DOCUMENTS

| | | | | |
|---|---|---|---|---|
| 6,025,455 A | * | 2/2000 | Yoshitake | ............. C01B 33/145 106/287.12 |
| 2003/0035888 A1 | * | 2/2003 | Eriyama | ............... C01B 33/145 427/212 |

FOREIGN PATENT DOCUMENTS

| | | |
|---|---|---|
| JP | H0692621 A | 4/1994 |
| JP | H1143319 A | 2/1999 |
| JP | 2001213617 A | 8/2001 |
| JP | 2003012320 A | 1/2003 |
| JP | 2007119310 A | 5/2007 |
| JP | 2009155138 A | 7/2009 |
| JP | 2012214554 A | 11/2012 |
| WO | WO-2011109302 A2 | 9/2011 |

OTHER PUBLICATIONS

International Preliminary Report on Patentability for PCT/JP2015/065382 dated Sep. 1, 2015.
International Search Report for PCT/JP2015/065382 dated Sep. 1, 2015.
Waddell, T., et al., "The Nature of Organosilane to Silica-Surface Bonding", J. Am. Chem., 1981, vol. 103, pp. 5303-5307.

* cited by examiner

*Primary Examiner* — Robert Harlan
(74) *Attorney, Agent, or Firm* — Drinker Biddle & Reath LLP

(57) ABSTRACT

[Problem]
To provide a dispersion containing surface-modified silica nanoparticles highly dispersed in an organic dispersion medium and also having high transparency and storage stability.
[Solution]
Disclosed is a method for producing surface-modified silica nanoparticles comprising: preparing a first silica nanoparticle dispersion containing silica nanoparticles and an aqueous dispersion medium; replacing the aqueous dispersion medium in the first silica nanoparticle dispersion with an organic dispersion medium comprising at least one selected from cyclic esters or cyclic amides, to obtain a second silica nanoparticle dispersion; and mixing the second silica nanoparticle dispersion with a silane coupling agent represented by the formula (1):

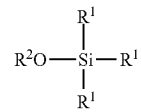

(each $R^1$ is independently a hydrocarbon group of $C_1$ to $C_{20}$ and $R^2$ is a hydrocarbon group of $C_1$ to $C_3$), to modify the surface of the silica nanoparticles.

10 Claims, No Drawings

METHOD FOR PRODUCING SURFACE-MODIFIED SILICA NANOPARTICLES, AND SURFACE-MODIFIED SILICA NANOPARTICLES

CROSS-REFERENCE TO RELATED APPLICATIONS

This application is a national stage application (under 35 U.S.C. § 371) of PCT/JP2015/065382, filed May 28, 2015, which claims benefit of Japanese Application No. 2014-114873, filed Jun. 3, 2014, both of which are incorporated herein by reference in their entirety.

TECHNICAL FIELD

The present invention relates to a method for producing surface-modified silica nanoparticles and also relates to the surface-modified silica nanoparticles. The invention further relates to a dispersion of the surface-modified silica nanoparticles.

BACKGROUND ART

According as nanotechnology has been developed, colloidal silica materials comprising nanosized silica particles have been getting widely used. Colloidal silica is generally known to improve the thermal and mechanical properties of materials mixed therewith, and hence is employed as an additive in various resins and dispersion media. However, commercially available colloidal silica is generally in the form of aqueous colloidal solution or powder, and is accordingly poor in dispersibility when added in organic dispersion media or resins. In view of that, in order to solve the problem of dispersibility, it has been desired to provide non-aqueous colloid (which is also referred to as "organosol").

Heretofore, many attempts have been made to produce non-aqueous colloid. In those attempts, surface of colloidal silica is modified (to be hydrophobic) so as to manufacture organosol materials homogeneously dispersible in organic dispersion media (for example, see, Patent documents 1 to 4).

PRIOR ART DOCUMENTS

Patent Documents

[Patent document 1] Japanese Patent Laid-Open No. H11 (1999)-43319
[Patent document 2] Japanese Patent Laid-Open No. 2009-155138
[Patent document 3] Japanese Patent Laid-Open No. 2012-214554
[Patent document 4] Japanese Patent Laid-Open No. 2001-213617

DISCLOSURE OF INVENTION

Problem to be Solved by the Invention

However, although the methods disclosed above can provide colloidal silica materials dispersed in organic dispersion media or resins, there is still room for improvement in view of transparency of the dispersion. The present inventors have studied and researched the method for solving this problem, and consequently found that surface-modified silica nanoparticles can show high dispersibility, transparency and storage stability when dispersed in organic dispersion media if they are obtained in a manner in which: a dispersion containing silica nanoparticles and an aqueous dispersion medium is treated to replace the aqueous dispersion medium with an organic dispersion medium comprising at least one selected from cyclic esters or cyclic amides, and then the silica nanoparticles are subjected to surface-modification with a particular silane coupling agent. The present invention has been achieved on the basis of this finding.

It is thus an object of the present invention to provide a method for producing surface-modified silica nanoparticles showing high dispersibility, transparency and storage stability in organic dispersion media, and also to provide the surface-modified silica nanoparticles.

Further, it is another object of the present invention to provide a dispersion in which the surface-modified silica nanoparticles produced according to the method of the present invention are dispersed in an organic dispersion medium.

Means for Solving Problem

An embodiment of the present invention provides a method for producing surface-modified silica nanoparticles comprises:

preparing a first silica nanoparticle dispersion containing silica nanoparticles and an aqueous dispersion medium;

replacing said aqueous dispersion medium in said first silica nanoparticle dispersion with an organic dispersion medium comprising at least one selected from cyclic esters or cyclic amides, to obtain a second silica nanoparticle dispersion; and mixing said second silica nanoparticle dispersion with a silane coupling agent represented by the formula (1):

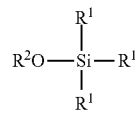

in which each $R^1$ is independently a hydrocarbon group of $C_1$ to $C_{20}$ and $R^2$ is a hydrocarbon group of $C_1$ to $C_3$, to modify the surface of the silica nanoparticles.

In a preferred embodiment, the above organic dispersion medium comprises at least one selected from cyclic esters or amides represented by the formula (2):

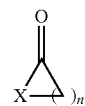

in which X is O or $NR^3$ where $R^3$ is H or a hydrocarbon group of $C_1$ to $C_3$, and n is an integer of 2 to 5.

Another embodiment of the present invention provides the surface-modified silica nanoparticles obtained by the above method and also provides a surface-modified silica nanoparticle dispersion obtained by dispersing said surface-modified silica nanoparticles in an organic dispersion medium.

Effect of the Invention

The present invention provides surface-modified silica nanoparticles capable of being favorably dispersed in various organic dispersion media to form highly transparent silica nanoparticle dispersions, and also provides a producing method thereof.

DETAILED DESCRIPTION

[Method for Producing Surface-Modified Silica Nanoparticles]

The method of the present invention for manufacturing surface-modified silica nanoparticles will be concretely described below. The method for producing surface-modified silica nanoparticles of the present invention comprises the steps of: preparing a first silica nanoparticle dispersion containing silica nanoparticles and an aqueous dispersion medium; replacing the aqueous dispersion medium in the first silica nanoparticle dispersion with an organic dispersion medium comprising at least one selected from cyclic esters or cyclic amides, to obtain a second silica nanoparticle dispersion (replacement step); and mixing said second silica nanoparticle dispersion with a particular silane coupling agent, to modify the surface of the silica nanoparticles (surface modification step). Each step will be explained below in detail.

<Step of Preparing a First Silica Nanoparticle Dispersion>

First, in the method of the present invention for producing surface-modified silica nanoparticles, a first silica nanoparticle dispersion is prepared which contains silica nanoparticles and an aqueous dispersion medium. The first silica nanoparticle dispersion can be prepared by adding and stirring silica nanoparticles in an aqueous dispersion medium. It is also possible to prepare a commercially available silica nanoparticle dispersion, such as, colloidal silica.

Examples of the silica nanoparticles usable in the present invention include: dry silica (which is also referred to as "fumed silica") obtained by a dry process, such as combustion method, and wet silica obtained by a wet process, such as precipitation method, gel method or sol-gel method. As the silica nanoparticles, it is also possible to adopt commercially available ones, such as, dry silica of REOLOSIL series ([trademark], manufactured by Tokuyama Corporation). The silica nanoparticles employed in the present invention have a volume mean particle size of preferably 100 nm or less, more preferably 50 nm or less. The volume mean particle size can be measured according to dynamic light scattering (DLS) method by means of an analyzer, such as Nanotrac particle size distribution analyzer ([trademark], manufactured by Nikkiso Co., Ltd.).

The aqueous dispersion medium used in the present invention mainly comprises water. If necessary, it may contain other components in small amounts. However, the amounts of the components other than water are preferably 30 wt % or less based on the whole weight.

The amount of the silica nanoparticles in the first silica nanoparticle dispersion can be appropriately selected, but is preferably 10 to 60 wt %, more preferably 20 to 50 wt %.

Examples of the commercially available silica nanoparticle dispersion usable in the present invention include: Klebosol series ([trademark], manufactured by AZ electronic materials K.K.), Snowtex series ([trademark], manufactured by NISSAN CHEMICAL INDUSTRIES, LTD), Quartron PLEASE series ([trademark], manufactured by FUSO CHEMICAL CO, LTD), ADELITE AT series ([trademark], manufactured by ADEKA CORPORATION). However, those by no means restrict the present invention.

<Replacement Step>

Subsequently, in the method for producing surface-modified silica nanoparticles of the present invention, the aqueous dispersion medium in the first silica nanoparticle dispersion is replaced with an organic dispersion medium comprising at least one selected from cyclic esters or cyclic amides, to obtain a second silica nanoparticle dispersion containing the silica nanoparticles dispersed in the organic dispersion medium.

The organic dispersion medium, which is used for converting the aqueous dispersion medium in the first silica nanoparticle dispersion into an organic dispersion medium, comprises at least one selected from cyclic esters or cyclic amides. Without wishing to be bound by any theory, it is presumed that, since serving as a dispersion medium, the organic dispersion medium coats the surface of the nanoparticles and thereby keeps the dispersion state and also provides effects of improving the reactivity and of reducing side reactions when the nanoparticles react with the silane coupling agent. There are no particular limitations on the cyclic esters or amides as long as they are in liquid state at room temperature, but it is preferred to adopt the cyclic esters or amides represented by the following formula (2):

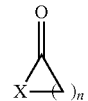

in which X is O or $NR^3$ where $R^3$ is H or a hydrocarbon group of $C_1$ to $C_3$, and n is an integer of 2 to 5. Examples of the cyclic esters represented by the formula (2) include: β-propiolactone (n=2: 4-membered ring), γ-butyrolactone (n=3: 5-membered ring), δ-valerolactone (n=4: 6-membered ring), and ε-caprolactone (n=5: 7-membered ring). Examples of the cyclic amides represented by the formula (2) include: δ-lactam (n=2: 4-membered ring), γ-lactam (n=3: 5-membered ring) and δ-lactam (n=4: 6-membered ring), in which $R^3$ is H; and 1-methyl-2-pyrrolidone (n=3: 5-membered ring) and 1-methyl-2-piperidone (n=4: 6-membered ring), in which $R^3$ is a hydrocarbon group of $C_1$ to $C_3$. Among them, γ-butyrolactone (boiling point: 205° C.) is particularly preferred in view of availability (because it is not desirable for the cyclic esters or amides to cost too much) and of operability (because it is not desirable for the cyclic esters or amides to have boiling points much lower or higher than that of water). In the present specification, the term "room temperature" means a temperature of 20 to 30° C.

In addition to the above organic dispersion medium, the second silica nanoparticle dispersion may further comprise another dispersion medium selected from ethers, non-cyclic esters, non-cyclic amides or mixtures thereof. Examples of the ethers include: tetrahydrofuran (THF), 1,4-dioxane, 1,2-dimethoxyethane, and bis(2-methoxy-ethyl)ether. Examples of the non-cyclic esters include: ethyl acetate and propyleneglycol-1-monomethyl-ether-2-acetate (PGMEA). Examples of the non-cyclic amides include: N,N-dimethylformamide (DMF) and N,N-dimethylacetamide (DMAC). However, they by no means restrict the present invention. Those optional dispersion media may be contained in an amount of at most about 15 wt % based on the weight of the organic dispersion medium comprising at least one selected from cyclic esters or cyclic amides.

The replacement of the dispersion medium can be carried out in any known manner. Specifically, for example, the aqueous dispersion medium is removed by centrifugation and then the organic dispersion medium is added to replace the dispersion medium. It is also possible to remove the aqueous dispersion medium by distillation under reduced pressure with a rotary evaporator or the like or otherwise by use of a separation membrane such as an ultrafiltration membrane. According to necessity, the dispersion medium may be replaced either at room temperature or under heating. As a result of the dispersion medium replacement, the dispersion medium in the second silica nanoparticle dispersion preferably consists of substantially only the organic dispersion medium so that the content of the aqueous dispersion medium may be 1% or less.

Before replaced with the organic dispersion medium, the aqueous dispersion medium may be mixed with one or more alcohols having boiling points lower than that of the organic dispersion medium by 30° C. or more. If the alcohols are thus added, the time for the replacement step can be shortened by azeotropic distillation. The alcohols having such relatively low boiling points as to be employable here depend on what organic dispersion medium is used, but examples thereof include methanol, ethanol, 1-propanol, 2-propanol (or isopropyl alcohol (IPA)), and 1-methoxy-2-propanol (or propyleneglycol monomethyl ether (PGME)). However, they by no means restrict the present invention. Those alcohols are used in an amount preferably 3 to 10 times, further preferably 5 to 8 times as large in weight as the aqueous dispersion medium.

The amount of the silica nanoparticles in the second silica nanoparticle dispersion can be appropriately selected, but is preferably 1 to 45 wt %, more preferably 10 to 30 wt %. If the second silica nanoparticle dispersion is controlled to contain the silica nanoparticles in an amount within the above range, the viscosity thereof can be prevented from increasing excessively so that the operatability can be kept favorable.

<Surface Modification Step>

In the surface modification step of the producing method according to the present invention, the second silica nanoparticle dispersion obtained by the replacement step is mixed with a silane coupling agent represented by the following formula (1):

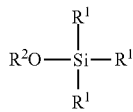

in which each $R^1$ is independently a hydrocarbon group of $C_1$ to $C_{20}$ and $R^2$ is a hydrocarbon group of $C_1$ to $C_3$. Examples of the silane coupling agent represented by the formula (1) include: methoxytrimethylsilane, methoxytriethylsilane, methoxytripropylsilane, methoxytributylsilane, ethoxytripropylsilane, ethoxytributylsilane, propoxytrimethylsilane, allyloxytrimethylsilane, methoxymethyldiethylsilane, methoxy(dimethyl)-butylsilane, methoxy(dimethyl)octylsilane, methoxy(dimethyl)decylsilane, methoxy(dimethyl)tetradecylsilane, and methoxy(dimethyl)octadecylsilane. However, they by no means restrict the present invention.

The amount of the silane coupling agent adopted in the surface modification step can be appropriately selected. However, the silane coupling agent is preferably added in an amount about twice to 5 times as large in molar ratio as the number of silanol groups existing on the surface of the silica nanoparticles. Here, the number of silanol groups existing on the silica nanoparticle surface can be determined according to the method described in "The chemistry of Silica: Solubility, Polymerization, Colloid and Surface Properties and Biochemistry of Silica; written by Ralph K. Iler (1979), published by John Wiley & Sons, Inc.", in which it is also described that there are 4 to 5 hydroxyl groups per 1 $nm^2$ (100 square angstrom) on the silica surface. This means that, if spherical silica having 25 nm diameter (radius: r=25/2 nm) is adopted, the number of hydroxyl (silanol) groups can be estimated to be a value 4 to 5 times as large as the surface area calculated according to the formula ($S=4$ $πr^2$) on the basis of the method described in the above literature. It is still also described in the literature that about 4.6 hydroxyl groups per 1 $nm^2$ are generally observed on the amorphous silica surface treated at a high temperature. Accordingly, in the present invention, the number of hydroxyl (silanol) groups is considered to be a value 4.6 times as large as the surface area of spherical silica.

The surface modification step may be carried out either at room temperature or under heating according to necessity. The above silane coupling agent is added to the second silica nanoparticle dispersion and then preferably stirred with a magnetic stirrer or the like so that the reaction can proceed smoothly and homogeneously. The time for the surface modification step can be appropriately controlled according to the temperature and the amount of the adopted silica nanoparticles.

As a result of the surface modification step, the silica nanoparticles dispersed in the dispersion medium are surface-modified. Without wishing to be bound by any theory, it is presumed that the silanol groups existing on the silica nanoparticle surface are at least partly made to react with the silane coupling agent of the formula (1) to form —$OSiR^1_3$ groups on the nanoparticle surface and consequently to change the silica nanoparticle surface in affinities to aqueous and organic dispersion media. This surface-modification enables the silica nanoparticles to show high transparency when they are dispersed in an organic dispersion medium.

After subjected to the surface-modification, the silica nanoparticles can be surface-analyzed with a FT-IR (FT/IR-4000, [trademark], manufactured by JASCO Corporation) according to the method described in Japanese Patent Laid-Open No. H6(1994)-92621. Specifically, the FT-IR absorption spectra of the silica nanoparticles are compared between before and after the surface-modification to observe change of the peak (in 3400 to 3500 $cm^{-1}$) attributed to Si—OH, and thereby it can be judged whether or not the silica nanoparticles are surface-modified with the silane coupling agent.

The surface-modified silica nanoparticles in a dispersion can be subjected to visual sensory evaluation so as to evaluate the transparency. The dispersibility thereof can be also visually evaluated.

Surprisingly, the present inventors have found an unexpected fact that the silane coupling agent can be so changed as to select an organic dispersion medium in which the surface-modified silica nanoparticles are dispersed to form a dispersion having high transparency. Specifically, if the adopted silane coupling agent is represented by the formula (1) in which all $R^1$s are hydrocarbon groups of $C_1$ to $C_7$, the surface-modified silica nanoparticles exhibit high dispersibility, transparency and storage stability in a hydrophilic organic dispersion medium. Examples of that silane coupling agent include: methoxytrimethylsilane, methoxytriethylsilane, methoxytripropylsilane, methoxytributylsilane, ethoxytripropylsilane, ethoxytributylsilane, propoxytrimethylsilane, allyloxytrimethylsilane, methoxymethyldiethylsilane, and methoxy(dimethyl)butylsilane. Also, examples of the hydrophilic organic dispersion medium include: alcohols, such as, methanol, ethanol, propanol and butanol; polyalcohols, such as, ethylene glycol, propylene glycol, and glycerin; ethers, such as, dimethyl ether, ethylmethyl ether, and tetrahydrofuran; ketones, such as, acetone, methylethyl ketone, and diethyl ketone; lactones (cyclic esters), such as, β-propiolactone, γ-butyrolactone and δ-valerolactone; and lactams (cyclic amides), such as, 2-pyrrolidone and N-methyl-2-pyrrolidone.

On the other hand, if the employed silane coupling agent is represented by the formula (1) in which at least one $R^1$ is a hydrocarbon group of $C_8$ to $C_{20}$, the surface-modified silica nanoparticles exhibit high dispersibility, transparency and storage stability in a hydrophobic organic dispersion medium. Examples of that silane coupling agent include: methoxy(dimethyl)octylsilane, methoxy(dimethyl)decylsilane, methoxy(dimethyl)tetradecylsilane, and methoxy(dimethyl)octadecylsilane. Also, examples of the hydrophobic organic dispersion medium include: straight-chain aliphatic hydrocarbons, such as, pentane, hexane and heptane; cyclic aliphatic hydrocarbons, such as, cyclohexane, cycloheptane, and decalin (decahydronaphthalene); and aromatic hydrocarbons, such as, benzene, toluene and xylene. As the hydrophilic organic dispersion medium, γ-butyrolactone or N-methyl-2-pyrrolidone is preferred. As the hydrophobic organic dispersion medium, hexane, decalin or toluene is preferred. The above effect of dispersion medium-selectivity appears remarkably when the used silane coupling agent is represented by the formula (1) in which two of the three $R^1$s are short-chain hydrocarbon groups (e.g., hydrocarbon groups of $C_1$ to $C_3$).

<Optional Steps>

After the above surface modification step, the surface-modified silica nanoparticles of the present invention may be directly used for practical application. However, they may be further subjected to filtration and drying before practical use. As a result of the filtration and drying steps, the surface-modified silica nanoparticles can be obtained in the form of powder. In view of the storage and transportation, the silica nanoparticles in the form of powder are more favorable than those in the form of a dispersion. Accordingly, the method for producing surface-modified silica nanoparticles of the present invention preferably further comprises the steps of filtrating the second silica nanoparticle dispersion and of drying the collected precipitates after the step of surface-modifying the silica nanoparticles. If the precipitates are not formed in the dispersion after the surface modification step, the dispersion may be poured into water to form precipitates and then filtrated. After the filtration step, the surface-modified silica nanoparticles may be dispersed again in an organic dispersion medium to obtain a surface-modified silica nanoparticle dispersion.

In addition, the method for producing surface-modified silica nanoparticles of the present invention furthermore comprises the step of washing the surface-modified silica nanoparticles between the steps of filtration and drying. The nanoparticles can be washed with any cleaning solvent, such as, alcohols. The washing step makes it possible to remove residues, such as, the silane coupling agent and cyclic ester or amide remaining after the surface modification step. The surface-modified silica nanoparticles thus obtained can be dispersed in a desired organic dispersion medium to produce a surface-modified silica nanoparticle dispersion less contaminated with impurities.

<Surface-Modified Silica Nanoparticles>

The surface-modified silica nanoparticles obtained by the producing method according to the present invention can exhibit high dispersibility, transparency and storage stability when dispersed in an organic dispersion medium. They have a volume mean particle size of preferably 100 nm or less, more preferably 50 nm or less. The volume mean particle size can be measured according to dynamic light scattering (DLS) method by means of an analyzer, such as, Nanotrac particle size distribution analyzer ([trademark], manufactured by Nikkiso Co., Ltd.).

<Surface-Modified Silica Nanoparticle Dispersion>

The above surface-modified silica nanoparticles can be dispersed in a desired organic dispersion medium to produce a surface-modified silica nanoparticle dispersion. The amount of the silica nanoparticles in the dispersion can be appropriately selected, but is preferably 3 to 40 wt %, more preferably 5 to 30 wt %. If contained in an amount within the above range, the surface-modified silica nanoparticles of the present invention can exhibit favorable dispersibility, transparency and storage stability in the dispersion.

EXAMPLES

The present invention will be further explained below in detail by Examples.

Example 1

(1) Preparation of Second Silica Nano Article Dispersion Containing GBL

An aqueous dispersion (30.0 g) of silica sol ($SiO_2$ content: 30 wt %, mean particle size: 25 nm; Klebosol 30HB 25K [trademark], manufactured by AZ electronic materials K.K.) was mixed with γ-butyrolactone (GBL) as the cyclic ester in an amount of 13.5 g (which corresponds to a weight 0.45 times as large as the weight of the silica sol aqueous dispersion). The mixture was stirred and then distilled under reduced pressure with a rotary evaporator, so that the aqueous dispersion medium of the silica sol was replaced with γ-butyrolactone to prepare a silica nanoparticle-GBL dispersion (22.5 g), in which the contents of $SiO_2$ and water were 40 wt % and 1 wt % or less, respectively.

(2) Surface-Modification of Silica Nanoparticles

After the above step of replacing the dispersion medium, the silica nanoparticle-GBL dispersion (9.275 g) was placed in a reaction vessel equipped with a stirrer. Successively, methoxytrimethylsilane (1.69 g) and γ-butyrolactone (38.16 g) were added thereinto and then the mixture was stirred. Subsequently, after the reaction was conducted at room temperature for 48 hours, the reaction dispersion was poured into water (300 g, which corresponds to a weight about 5 times as large as the weight of the reaction dispersion). The formed precipitates were collected by filtration, washed with isopropyl alcohol and dried in vacuum at 40° C., to obtain the product (surface-modified silica nanoparticles) in a yield of 85%.

The dispersibility and transparency of the product were confirmed. As a result, the produced nanoparticles exhibited favorable dispersibility and transparency when dispersed in both γ-butyrolactone and N-methyl-2-pyrrolidone, which are hydrophilic organic dispersion media, in amounts of 5 wt %, 15 wt % and 30 wt %. The prepared γ-butyrolactone and NMP dispersions of the surface-modified silica nanoparticles were individually successfully filtrated through a microfilter having a pore diameter of 0.20 µm (Millex [trademark] FG (Syring-driven Filter Unit) Hydrophobic Fluoropore™ (PTFE) Membrane for Fine Particle Removal from Organic Solution, manufactured by MILLIPORE).

Example 2

(1) Preparation of Second Silica Nanoparticle Dispersion Containing GBL

The procedure of Example 1 was repeated to prepare a second nanoparticle dispersion.

(2) Surface-Modification of Silica Nanoparticles

After the above step of replacing the dispersion medium, the silica nanoparticle-GBL dispersion (9.275 g) was placed in a reaction vessel equipped with a stirrer. Successively, methoxy(dimethyl)octylsilane (3.29 g) and γ-butyrolactone (38.16 g) were added thereinto and then the mixture was stirred. Subsequently, after the reaction was conducted at room temperature for 48 hours, the formed precipitates were collected by filtration, washed with isopropyl alcohol and dried in vacuum at 40° C., to obtain the product (surface-modified silica nanoparticles) in a yield of 83%.

The dispersibility and transparency of the product were confirmed. As a result, the produced nanoparticles exhibited favorable dispersibility and transparency when dispersed in both decalin and toluene, which are hydrophobic organic dispersion media, in amounts of 5 wt %, 15 wt % and 30 wt %. The prepared decalin and toluene dispersions of the surface-modified silica nanoparticles were individually successfully filtrated through a microfilter having a pore diameter of 0.20 µm (Millex [trademark] FG (Syring-driven Filter Unit) Hydrophobic Fluoropore™ (PTFE) Membrane for Fine Particle Removal from Organic Solution, manufactured by MILLIPORE).

Example 3

(1) Preparation of Second Silica Nanoparticle Dispersion Containing GBL

The procedure of Example 1 was repeated to prepare a second nanoparticle dispersion.

(2) Surface-Modification of Silica Nanoparticles

After the above step of replacing the dispersion medium, the silica nanoparticle-GBL dispersion (9.275 g) was placed in a reaction vessel equipped with a stirrer. Successively, methoxy(dimethyl)octylsilane (5.565 g) and GBL (38.16 g) were added thereinto and then the mixture was stirred. Subsequently, after the reaction was conducted at room temperature for 48 hours, the formed precipitates were collected by filtration, washed with isopropyl alcohol and dried in vacuum at 40° C., to obtain the product (surface-modified silica nanoparticles) in a yield of 87%.

The dispersibility and transparency of the product were confirmed. As a result, the produced nanoparticles exhibited favorable dispersibility and transparency when dispersed in both decalin and toluene, which are hydrophobic organic dispersion media, in amounts of 5 wt %, 15 wt % and 30 wt %. The prepared decalin and toluene dispersions of the surface-modified silica nanoparticles were individually successfully filtrated through a microfilter having a pore diameter of 0.20 µm (Millex [trademark] FG (Syring-driven Filter Unit) Hydrophobic Fluoropore™ (PTFE) Membrane for Fine Particle Removal from Organic Solution, manufactured by MILLIPORE).

Example 4

(1) Preparation of Second Silica Nanoparticle Dispersion Containing IPA and GBL

An aqueous dispersion (30.0 g) of silica sol ($SiO_2$ content: 30 wt %, mean particle size: 25 nm; Klebosol 30HB 25K [trademark], manufactured by AZ electronic materials K.K.) was mixed with isopropanol (IPA) in an amount of 180 g (which corresponds to a weight 6 times as large as the weight of the silica sol aqueous dispersion) and γ-butyrolactone (GBL) as the cyclic ester in an amount of 13.5 g (which corresponds to a weight 0.45 times as large as the weight of the silica sol aqueous dispersion). The mixture was stirred and then distilled under reduced pressure with a rotary evaporator, so that the aqueous dispersion medium of the silica sol was replaced with γ-butyrolactone to prepare a silica nanoparticle-GBL dispersion (22.5 g), which contained $SiO_2$ in a content of 40 wt % and water and IPA in a total content of 1 wt % or less.

(2) Surface-Modification of Silica Nanoparticles

The procedure of Example 3 was repeated to surface-modify the silica nanoparticles, to obtain surface-modified silica nanoparticles.

The dispersibility and transparency of the produced surface-modified silica nanoparticles were confirmed. As a result, the produced nanoparticles exhibited favorable dispersibility and transparency when dispersed in both decalin and toluene, which are hydrophobic organic dispersion media, in amounts of 5 wt %, 15 wt % and 30 wt %. The 30 wt % dispersions were very slightly clouded, but the degrees thereof were practically negligible. The prepared decalin and toluene dispersions of the surface-modified silica nanoparticles were individually successfully filtrated through a microfilter having a pore diameter of 0.20 µm (Millex [trademark] FG (Syring-driven Filter Unit) Hydrophobic Fluoropore™ (PTFE) Membrane for Fine Particle Removal from Organic Solution, manufactured by MILLIPORE).

Example 5

(1) Preparation of Second Silica Nanoparticle Dispersion Containing DVL

An aqueous dispersion (30.0 g) of silica sol ($SiO_2$ content: 30 wt %, mean particle size: 25 nm; Klebosol 30HB 25K [trademark], manufactured by AZ electronic materials K.K.) was mixed with δ-valerolactone (DVL) as the cyclic ester in an amount of 13.5 g (which corresponds to a weight 0.45 times as large as the weight of the silica sol aqueous dispersion). The mixture was stirred and then distilled under reduced pressure with a rotary evaporator, so that the aqueous dispersion medium of the silica sol was replaced with δ-valerolactone to prepare a silica nanoparticle-DVL dispersion (22.5 g), in which the contents of $SiO_2$ and water were 40 wt % and 1 wt % or less, respectively.

(2) Surface-Modification of Silica Nanoparticles

The procedure of Example 3 was repeated except for adding DVL in place of GBL, to surface-modify the silica nanoparticles and thereby to obtain surface-modified silica nanoparticles.

The dispersibility and transparency of the produced surface-modified silica nanoparticles were confirmed. As a result, the produced nanoparticles exhibited favorable dispersibility and transparency when dispersed in both decalin and toluene, which are hydrophobic organic dispersion media, in amounts of 5 wt %, 15 wt % and 30 wt %. The 30 wt % dispersions were very slightly clouded, but the degrees thereof were practically negligible. The prepared decalin and toluene dispersions of the surface-modified silica nanoparticles were individually successfully filtrated through a microfilter having a pore diameter of 0.20 μm (Millex [trademark] FG (Syring-driven Filter Unit) Hydrophobic Fluoropore™ (PTFE) Membrane for Fine Particle Removal from Organic Solution, manufactured by MILLIPORE).

Example 6

(1) Preparation of Second Silica Nanoparticle Dispersion Containing EHL

An aqueous dispersion (30.0 g) of silica sol ($SiO_2$ content: 30 wt %, mean particle size: 25 nm; Klebosol 30HB 25K [trademark], manufactured by AZ electronic materials K.K.) was mixed with ε-caprolactone (EHL) as the cyclic ester in an amount of 13.5 g (which corresponds to a weight 0.45 times as large as the weight % of the silica sol aqueous dispersion). The mixture was stirred and then distilled under reduced pressure with a rotary evaporator, so that the aqueous dispersion medium of the silica sol was replaced with ε-caprolactone to prepare a silica nanoparticle-EHL dispersion (22.5 g), in which the contents of $SiO_2$ and water were 40 wt % and 1 wt % or less, respectively.

(2) Surface-Modification of Silica Nanoparticles

The procedure of Example 3 was repeated except for adding EHL in place of GBL, to surface-modify the silica nanoparticles and thereby to obtain surface-modified silica nanoparticles.

The dispersibility and transparency of the produced surface-modified silica nanoparticles were confirmed. As a result, the produced nanoparticles exhibited favorable dispersibility and transparency when dispersed in both decalin and toluene, which are hydrophobic organic dispersion media, in amounts of 5 wt %, 15 wt % and 30 wt %. The 30 wt % dispersions were very slightly clouded, but the degrees thereof were practically negligible. The prepared decalin and toluene dispersions of the surface-modified silica nanoparticles were individually successfully filtrated through a microfilter having a pore diameter of 0.20 μm (Millex [trademark] FG (Syring-driven Filter Unit) Hydrophobic Fluoropore™ (PTFE) Membrane for Fine Particle Removal from Organic Solution, manufactured by MILLIPORE).

Example 7

(1) Preparation of Second Silica Nanoparticle Dispersion Containing NMP

An aqueous dispersion (30.0 g) of silica sol ($SiO_2$ content: 30 wt %, mean particle size: 25 nm; Klebosol 30HB 25K [trademark], manufactured by AZ electronic materials K.K.) was mixed with 1-methyl-2-pyrrolidone (NMP) as the cyclic amide in an amount of 13.5 g (which corresponds to a weight 0.45 times as large as the weight % of the silica sol aqueous dispersion). The mixture was stirred and then distilled under reduced pressure with a rotary evaporator, so that the aqueous dispersion medium of the silica sol was replaced with 1-methyl-2-pyrrolidone to prepare a silica nanoparticle-NMP dispersion (22.5 g), in which the contents of $SiO_2$ and water were 40 wt % and 1 wt % or less, respectively.

(2) Surface-Modification of Silica Nanoparticles

The procedure of Example 3 was repeated except for adding NMP in place of GBL, to surface-modify the silica nanoparticles and thereby to obtain surface-modified silica nanoparticles.

The dispersibility and transparency of the produced surface-modified silica nanoparticles were confirmed. As a result, the produced nanoparticles exhibited favorable dispersibility and transparency when dispersed in both decalin and toluene, which are hydrophobic organic dispersion media, in amounts of 5 wt %, 15 wt % and 30 wt %. The 30 wt % dispersions were very slightly clouded, but the degrees thereof were practically negligible. The prepared decalin and toluene dispersions of the surface-modified silica nanoparticles were individually successfully filtrated through a microfilter having a pore diameter of 0.20 μm (Millex [trademark] FG (Syring-driven Filter Unit) Hydrophobic Fluoropore™ (PTFE) Membrane for Fine Particle Removal from Organic Solution, manufactured by MILLIPORE).

Comparative Example 1

Surface-Modification of Silica Nanoparticles in Water/Alcohol Dispersion

An aqueous dispersion (7.64 g) of silica sol ($SiO_2$ content: 30 wt %, mean particle size: 25 nm; Klebosol 30HB 25K [trademark], manufactured by AZ electronic materials K.K.) was placed in a reaction vessel equipped with a stirrer. Successively, methoxy(dimethyl)n-octadecylsilane (3.44 g), pure water (0.05 g) and isopropyl alcohol (21.61 g) were added thereinto and then the mixture was stirred. Subsequently, after the reaction was conducted at room temperature for 48 hours, the formed precipitates were collected by filtration, washed with isopropyl alcohol and dried in vacuum at 40° C., to obtain the product (surface-modified silica nanoparticles) in a yield of 88%.

The dispersibility of the product was confirmed. As a result, the produced nanoparticles exhibited favorable dispersibility when dispersed in both decalin and toluene, which are hydrophobic organic dispersion media, in an amount of 5 wt %. On the other hand, however, the dispersions were clouded and hence found to be poor in transparency. Further, the prepared decalin and toluene dispersions of the surface-modified silica nanoparticles were individually attempted to be filtrated through a microfilter having a pore diameter of 0.20 μm (Millex [trademark] FG (Syring-driven Filter Unit) Hydrophobic Fluoropore™ (PTFE) Membrane for Fine Particle Removal from Organic Solution, manufactured by MILLIPORE), but the attempts resulted in failure and the silica nanoparticles were observed to agglomerate.

Comparative Example 2

Surface-Modification of Silica Nanoparticles in Water/Alcohol Dispersion

After the step of replacing the dispersion medium was carried out in the manner described in Example 1, the silica nanoparticle-GBL dispersion (3.01 g) was placed in a reaction vessel equipped with a stirrer. Successively, γ-butyrolactone (31.39 g) and n-octadecyl-trimethoxysilane (1.57 g)

were added thereinto and then the mixture was stirred. Subsequently, after the reaction was conducted at room temperature for 48 hours, the formed precipitates were collected by filtration, washed with isopropyl alcohol and dried in vacuum at 40° C., to obtain the product (surface-modified silica nanoparticles) in a yield of 90%.

The dispersibility of the product was confirmed. As a result, the produced nanoparticles exhibited poor dispersibility when dispersed in any of decalin and toluene, which are hydrophobic organic dispersion media, and N-methyl-2-pyrrolidone and γ-butyrolactone, which are hydrophilic organic dispersion media.

<Measurement of Mean Particle Size>

The mean particle sizes of the surface-modified silica nanoparticles obtained in Examples 1 to 7 were measured according to dynamic light scattering method (by means of Nanotrac particle size distribution analyzer [trademark], manufactured by Nikkiso Co., Ltd.). The silica nanoparticles of each Example were dispersed in each dispersion medium to prepare a 1 wt % organosol dispersion, which was then subjected to the measurement. Each mean particle size was represented by the median diameter (D50). On the other hand, however, the mean particle size of the nanoparticles obtained in Comparative example 1 could not be measured by dynamic light scattering method. Since not penetrating the filter having a pore diameter of 0.20 μm, the surface-modified silica nanoparticles of Comparative example 1 were considered to have a mean particle size of more than 0.2 μm.

<Evaluation of Transparency>

As for the transparency, the surface-modified silica nanoparticle dispersions obtained in Examples 1 to 7 and Comparative example 1 and 2 were evaluated and classified into the following grades:
A: highly transparent and very clear without any cloud,
B: negligibly clouded,
C: clouded,
D: very clouded.

<Evaluation of Dispersibility>

As for the dispersibility, the surface-modified silica nanoparticle dispersions obtained in Examples 1 to 7 and Comparative example 1 and 2 were evaluated and classified into the following grades:
A: precipitates were not observed,
B: precipitates were observed.

<Evaluation of Storage Stability>

The surface-modified silica nanoparticle dispersions obtained in Examples 1 to 7 and Comparative example 1 and 2 were stored at room temperature for 3 months in sealed containers, and thereafter the storage stability of each dispersion was evaluated by visually observing whether the transparency changed or not and also by observing, according to dynamic light scattering method, whether the particle size increased or not and whether the nanoparticles precipitated or not.

The following Tables 1 to 3 show the results of the evaluations on the surface-modified silica nanoparticle dispersions obtained in Examples 1 to 7 and Comparative example 1 and 2.

TABLE 1

|  |  | Example 1 |  | Example 2 |  | Example 3 |  |
|---|---|---|---|---|---|---|---|
| Dispersion medium adopted in the replacement step |  | GBL |  | GBL |  | GBL |  |
| Silane coupling agent |  | methoxytrimethylsilane (C1) |  | methoxy(dimethyl)octylsilane (C8) |  | methoxy(dimethyl)octadecylsilane (C18) |  |
| Dispersion medium |  | GBL | NMP | decalin | toluene | decalin | toluene |
| Silica content (wt %) |  | 5 to 30 | 5 to 30 | 5 to 30 | 5 to 30 | 5 to 30 | 5 to 30 |
| Mean particle size |  | 26.5 nm | 27.1 nm | 28.4 nm | 28.9 nm | 30.9 nm | 31.2 nm |
| Transparency (5 wt %) |  | A | A | A | A | A | A |
| Transparency (15 wt %) |  | A | A | A | A | A | A |
| Transparency (30 wt %) |  | A | A | A | A | A | A |
| Dispersibility |  | A | A | A | A | A | A |
| Storage stability after 3 months | Change of transparency | not found | not found | not found | not found | not found | not found |
|  | Increase of particle size | not found | not found | not found | not found | not found | not found |
|  | Precipitation of particles | not found | not found | not found | not found | not found | not found |

TABLE 2

|  |  | Example 4 |  | Example 5 |  | Example 6 |  | Example 7 |  |
|---|---|---|---|---|---|---|---|---|---|
| Dispersion medium adopted in the replacement step |  | GBL + IPA |  | DVL |  | EHL |  | NMP |  |
| Silane coupling agent |  | methoxy(dimethyl)octadecylsilane (C18) |  | methoxy(dimethyl)octadecylsilane (C18) |  | methoxy(dimethyl)octadecylsilane (C18) |  | methoxy(dimethyl)octadecylsilane (C18) |  |
| Dispersion medium |  | decalin | toluene | decalin | toluene | decalin | toluene | decalin | toluene |
| Silica content (wt %) |  | 5 to 30 | 5 to 30 | 5 to 30 | 5 to 30 | 5 to 30 | 5 to 30 | 5 to 30 | 5 to 30 |
| Mean particle size |  | 31.9 nm | 32.3 nm | 31.2 nm | 31.9 nm | 29.9 nm | 30.8 nm | 30.5 nm | 30.8 nm |
| Transparency (5 wt %) |  | A | A | A | A | A | A | A | A |
| Transparency (15 wt %) |  | A | A | A | A | A | A | A | A |
| Transparency (30 wt %) |  | B | B | B | B | B | B | B | B |
| Dispersibility |  | A | A | A | A | A | A | A | A |
| Storage stability after 3 | Change of transparency | not found | not found | not found | not found | not found | not found | not found | not found |
|  | Increase of | not | not | not | not | not | not | not | not |

TABLE 2-continued

|  |  | Example 4 | | Example 5 | | Example 6 | | Example 7 | |
|---|---|---|---|---|---|---|---|---|---|
| months | particle size | found | found | found | found | found | found | found | found |
|  | Precipitation of particles | not found | not found | not found | not found | not found | not found | not found | not found |

TABLE 3

|  | Comparative example 1 | | Comparative example 2 | | | |
|---|---|---|---|---|---|---|
| Dispersion medium adopted in the replacement step | water + IPA | | GBL | | | |
| Silane coupling agent | methoxy(dimethyl)n-octadecylsilane | | n-octadecyltrimethoxysilane | | | |
| Dispersion medium | decalin | toluene | decalin | toluene | GBL | NMP |
| Silica content (wt %) | 5 | 5 | 5 | 5 | 5 | 5 |
| Mean particle size | >0.2 μm | >0.2 μm | — | — | — | — |
| Transparency (5 wt %) | C | C | D | D | D | D |
| Transparency (15 wt %) | — | — | — | — | — | — |
| Transparency (30 wt %) | — | — | — | — | — | — |
| Dispersibility | A | A | B | B | B | B |
| Storage stability after 3 months | Change of transparency | found | found | found | found | found | found |
|  | Increase of particle size | found | found | — | — | — | — |
|  | Precipitation of particles | found | found | found | found | found | found |

The invention claimed is:

1. A method for producing surface-modified silica nanoparticles which comprises:
 preparing a first silica nanoparticle dispersion containing silica nanoparticles and an aqueous dispersion medium;
 replacing said aqueous dispersion medium in said first silica nanoparticle dispersion with an organic dispersion medium comprising at least one selected from cyclic esters or cyclic amides, to obtain a second silica nanoparticle dispersion; and
 mixing said second silica nanoparticle dispersion with a silane coupling agent represented by the formula (1):

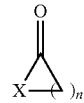

in which each
 $R^1$ is independently a hydrocarbon group of $C_1$ to $C_{20}$ and $R^2$ is a hydrocarbon group of $C_1$ to $C_3$, to modify the surface of the silica nanoparticles.

2. The method according to claim 1, wherein all the $R^1$s in said silane coupling agent are hydrocarbon groups of $C_1$ to $C_7$.

3. The method according to claim 1, wherein at least one of the $R^1$s in said silane coupling agent is a hydrocarbon group of $C_8$ to $C_{20}$.

4. The method according to claim 1, wherein said organic dispersion medium comprises at least one selected from cyclic esters or amides represented by the formula (2):

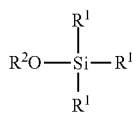

in which X is O or $NR^3$ where $R^3$ is H or a hydrocarbon group of $C_1$ to $C_3$, and n is an integer of 2 to 5.

5. The method according to claim 1, wherein said second silica nanoparticle dispersion further comprises another dispersion medium selected from ethers, non-cyclic esters, non-cyclic amides or mixtures thereof.

6. The method according to claim 1, wherein said aqueous dispersion medium is mixed with one or more alcohols having boiling points lower than that of said organic dispersion medium by 30° C. or more before replaced with said organic dispersion medium.

7. The method according to claim 1, wherein said surface-modified silica nanoparticles have a mean particle size of 100 nm or less.

8. The method according to claim 1, which further comprises the steps of filtrating and then drying said second silica nanoparticle dispersion after the step of surface-modifying said silica nanoparticles.

9. Surface-modified silica nanoparticles obtained by the method according to claim 1.

10. A surface-modified silica nanoparticle dispersion obtained by dispersing the surface-modified silica nanoparticles according to claim 9 in an organic dispersion medium.

* * * * *